US006948822B2

(12) United States Patent
Stenzel (10) Patent No.: US 6,948,822 B2
(45) Date of Patent: Sep. 27, 2005

(54) VEHICLE MIRROR MOUNTING APPARATUS AND METHOD FOR ASSEMBLING SAME

(75) Inventor: Alexander Stenzel, Bad Windsheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 10/856,226

(22) Filed: May 28, 2004

(65) Prior Publication Data

US 2004/0218298 A1 Nov. 4, 2004

Related U.S. Application Data

(63) Continuation of application No. 10/036,341, filed on Dec. 26, 2001, now Pat. No. 6,793,357.

(51) Int. Cl.[7] .............................................. G02B 7/182
(52) U.S. Cl. ........................ 359/879; 359/871; 359/872; 359/873
(58) Field of Search ........................ 359/879, 871–877, 359/841–844, 822–830; 248/468, 477–483

(56) References Cited

U.S. PATENT DOCUMENTS

| | | | |
|---|---|---|---|
| 2,652,648 A | | 9/1953 | Morley |
| 3,375,053 A | | 3/1968 | Ward |
| 3,522,584 A | | 8/1970 | Talbot |
| 3,642,344 A | | 2/1972 | Corker |
| 3,687,443 A | | 8/1972 | Anderson |
| 3,889,915 A | | 6/1975 | Hashiguchi et al. |
| 3,937,563 A | * | 2/1976 | Frabe .......................... 359/841 |
| 4,174,823 A | | 11/1979 | Sutton et al. |
| 4,349,247 A | | 9/1982 | Koyama et al. |
| 4,351,521 A | | 9/1982 | Erdos |
| 4,363,534 A | * | 12/1982 | Covert ........................ 359/841 |
| 4,555,166 A | | 11/1985 | Enomoto |
| 4,693,571 A | | 9/1987 | Kimura et al. |
| 4,696,555 A | | 9/1987 | Enomoto |
| 4,764,004 A | | 8/1988 | Yamada et al. |
| 4,818,090 A | | 4/1989 | Righi |
| 4,824,065 A | | 4/1989 | Manzoni |
| 4,867,408 A | | 9/1989 | Ozaki |
| 4,877,214 A | | 10/1989 | Toshiaki et al. |
| 4,915,493 A | | 4/1990 | Fisher et al. |
| 4,957,359 A | | 9/1990 | Kruse et al. |
| 4,991,950 A | | 2/1991 | Lang et al. |
| 5,120,015 A | * | 6/1992 | do Espirito Santo ........ 248/479 |
| 5,363,245 A | | 11/1994 | Borello |
| 5,363,246 A | | 11/1994 | Perry et al. |
| 5,436,769 A | | 7/1995 | Gilbert et al. |
| 5,467,230 A | | 11/1995 | Boddy et al. |
| 5,568,326 A | | 10/1996 | Yoshida et al. |
| 5,604,644 A | | 2/1997 | Lang et al. |
| 5,615,054 A | | 3/1997 | Lang et al. |
| 5,621,577 A | | 4/1997 | Lang et al. |
| D407,361 S | | 3/1999 | Lang |
| 6,213,611 B1 | * | 4/2001 | Rindone ...................... 359/871 |
| 6,302,549 B1 | | 10/2001 | Branham et al. |
| 6,478,436 B1 | * | 11/2002 | Jacobsen .................... 359/877 |

* cited by examiner

Primary Examiner—Mohammad Sikder
(74) Attorney, Agent, or Firm—McNair Law Firm, P.A.

(57) ABSTRACT

A mirror mounting apparatus for a mirror glass is provided. According to an aspect of the invention, a mounting rod having a bore and an outlet and affixable to a vehicle is also provided. The mirror mounting apparatus includes a mirror housing assembly with a base member for mounting to the mounting rod. The base member has an opening to deliver a wire from the outlet into the mirror housing assembly. A method for assembling the mirror mounting apparatus is also provided.

11 Claims, 4 Drawing Sheets

VEHICLE MIRROR MOUNTING APPARATUS AND METHOD FOR ASSEMBLING SAME

CROSS REFERENCE TO RELATED APPLICATION

This application is a continuation of U.S. application Ser. No. 10/036,341, filed Dec. 26, 2001, now U.S. Pat. No. 6,793,357, having the same title.

FIELD OF INVENTION

The present invention generally relates to mirror mounting assemblies. More particularly, the invention is directed to mirror mounting assemblies that accommodate an internal wire and allow a mirror housing to be biaxially adjusted relative to a mounting bar without undesired rotation.

BACKGROUND OF INVENTION

Different arrangements are known for mounting external mirrors on vehicles. On large, commercial vehicles, such as trucks and busses, mirrors are often secured within mirror housings mounted so as to extend the mirror away from the vehicle to provide a clear view of different areas around the vehicle. Depending on the size and design of the mirror, as well as the area around the vehicle to be observed, different mounting arrangements have been used. An exemplary mounting arrangement is described in pending U.S. patent application Ser. No. 09/390/971, which recites a biaxially adjustable mirror mounting assembly.

A drawback in the prior art is that wiring for mirror control motors, heating elements, electronic displays and the like must be routed circuitously about various internal components of existing mirror mounting assemblies. In a tightly spaced mirror mounting assembly, for instance, the wiring may be more susceptible to kinking and premature wear and tear, which may in turn cause the mirror mounting assembly to fail prematurely. In addition to the above, convoluted internal wiring of known mirror mounting assemblies makes assembly of component parts more difficult.

Another drawback in the prior art is that a space-constrained mirror mounting assembly may require that wiring be installed externally. Thus, the mirror mounting assembly may be unsightly and the wiring may be undesirably exposed to the outside atmosphere. Alternatively, tightly spaced mirror mounting assemblies may require a separate cover for the wiring, thus increasing installation time, assembly weight, and costs.

BRIEF SUMMARY OF INVENTION

The present invention provides a mirror mounting assembly in which the component parts of the mirror mounting assembly are simple and economical to manufacture, assemble, and use. Other advantages of the invention will be apparent from the following description and the attached drawings, or can be learned through practice of the invention.

In accordance with an aspect of the invention, as broadly described and depicted herein, a mirror mounting apparatus is disclosed for mounting a mirror glass to a mounting rod. The mounting rod is affixable to a vehicle and includes a bore and an outlet. Optionally, a wire to provide power to a mirror control motor, heater element or the like is routed from the vehicle through the bore and exits the outlet into a mirror housing assembly.

The mirror mounting apparatus includes the mirror housing assembly for supporting a mirror glass. The mirror housing assembly has a base member for mounting to the mounting rod. The base member has a shaft with an opening, which delivers the wire from the outlet of the bore into the mirror housing assembly.

Also included in the mirror mounting apparatus is a compression element, which sits coaxially about the shaft. The compression element resistively urges the mirror housing and the mounting rod together when a locking device, with engaged and disengaged positions, compresses the compression element in the engaged position to releasably hold the mirror housing and the mounting rod together.

In accordance with another aspect of the invention, an alternative mirror mounting apparatus includes an adjusting member with a shaft opening to receive the shaft of the base member and to route the wire into the mirror mounting apparatus. The adjusting member may be adjustably attached to the mirror housing assembly.

The mirror mounting apparatus may include biasing and locking devices. The biasing device, similar to the foregoing compression element, optimally urges the adjusting member, the mirror housing assembly, and the mounting rod together. The locking device has a terminal opening for delivery of the wire into the mirror mounting apparatus, and compresses the biasing device about the shaft. The locking device releasably holds the adjusting member, the mirror housing assembly, and the mounting rod together.

In accordance with another aspect of the invention, a mirror mounting assembly is disclosed having a mirror housing with a mirror for a vehicle. The mirror mounting assembly includes a mounting bar affixable to the vehicle, and the mounting bar has an inner surface that defines a cavity extending axially. The mounting bar also has a first opening in communication with the cavity, and the cavity can receive a wire from the first opening.

In this example, a base member has a first base surface and a conduit and can be mounted to a portion of the mounting bar. The conduit has a second opening and a securement element and routes the wire to the second opening.

The mirror mounting assembly may also have first and second slide members. The first slide member has a third opening, a first spherical surface, and a receiving surface. The third opening is for receiving the conduit and the wire. The second slide member has a fourth opening and a second spherical surface. The fourth opening is configured to receive the conduit and the wire, and the second spherical surface contacts and seats in the receiving surface. The first and second slide members slideably adjust relative to each other and to the mirror housing.

The mirror mounting assembly may also have a spring compression element and fastener operably similar, respectively, to the biasing and locking devices discussed above. The fastener may be rotatably locked to the securement element to couple the mirror mounting assembly together.

A more detailed aspect of the invention includes the mirror mounting assembly for a vehicle having the mounting bar and the base member, which has a first base surface and a conduit with a second opening. The conduit has a locking key and is configured to route the wire from the outlet through the second opening into the mirror mounting assembly.

This alternative mirror mounting assembly includes a mirror housing with a passage through which the conduit extends, a first receiving surface and a second base surface, which seats against the first base surface of the base member.

Also found in this exemplary embodiment is a first slide member with a third opening through which a conduit extends, a first spherical surface, a second receiving surface, and a first raised arcuate member. The second receiving surface has a second raised arcuate member, which has a first stopping surface, and the first receiving surface contacts the first spherical surface.

A second slide member with a fourth opening, a notch, a second groove with a second stopping surface, a mounting element, a second spherical surface, and a receptacle is also provided. Specifically, the notch is located near the fourth opening, and a spring compression element is provided to compressibly seat in the second slide member. When the mirror mounting assembly is assembled, the first and second stopping surfaces cooperate to impede a movement of the second slide member beyond a predetermined position. The mounting element has a proximal end and a distal end, the proximal end attached to the second slide member, the distal end depending from the proximal end away from the second slide member.

The fastener of this aspect of the invention has a fifth opening, which delivers an end of the wire to the mirror mounting assembly. The fastener can be depressed axially in a direction of the mounting bar to compress the spring compression element and urge together the base member, the mirror housing, the first slide member, and the second slide member. The fastener with a transition surface and the locking key operate to translate rotation of the fastener relative to the locking key to lock the mirror mounting assembly together.

In another aspect of the invention, a method of assembling a rearview mirror mounting assembly configured for receiving the wire is disclosed. Optimally, the mounting assembly has a housing, a base member with a hole in the base member, a cap member, a spring element, and a fastener. The method of assembling the rearview mirror mounting assembly for a vehicle may include the step of providing a mounting rod with an opening and an outlet. The rod optimally attaches to both the vehicle and to the base member. The opening in the rod should permit the wire to be fed through the rod and into the housing from the outlet.

Additional steps of the exemplary method may include providing the wire, feeding the wire through the opening in the mounting rod, feeding the wire through the hole in the base member and into the housing from the outlet, and connecting the wire to an element in the housing. The element can be an electric motor wire, a heating element wire, a signaling device wire, a hydraulic line, and/or a fiber optic cable. Preferably, for maintenance purposes, the base member and the cap member are releasably attached to the mounting rod. Other steps in the foregoing method of assembly may be connecting the housing, the base member, and the spring element together with the fastener, and attaching a mirror element to the housing.

BRIEF DESCRIPTION OF THE DRAWINGS

The present invention will be more fully understood from the following detailed description, taken in conjunction with the accompanying drawings, wherein like reference numerals refer to like parts, and in which.

DETAILED DESCRIPTION OF THE DRAWINGS

Detailed reference will now be made to the drawings in which examples embodying the present invention are shown. The drawings and the following detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

As broadly embodied in FIGS. 1–5, a mirror mounting apparatus made according to the present invention is provided in which a line or wire is optimally routed through the biaxially adjustable mirror mounting apparatus. As the Figures indicate, the mirror mounting apparatus or assembly 10 includes a mirror housing assembly 44 attached to a mounting rod or bar 12. Rod 12 has a first opening 14, a bore or cavity 16 extending the length of the rod 12, and an outlet or aperture 20 located at a desired point on the rod 12. The line or wire 22 is routed through the rod 12, out the outlet 20, and into the mirror housing assembly 44 to provide, for example, electrical power to mirror adjustment motors M, electronic displays or signals S, or to mirror heating elements H (see FIG. 3).

While the Figures generally illustrate the mirror mounting apparatus 10 including a C-shaped rod, such as mounting rod 12, extending substantially normal to a vehicle V, the mirror mounting apparatus 10 can utilize a variety of other installation angles and mounting structures. Likewise, the exemplary mirror housing assembly 44, which is depicted as generally rectangular shaped, mirror housing body 45 and mirror element 11 may possess a variety of geometries and be made of various materials. For example, mirror housing body 45 holding mirror element 11 may be round. Accordingly, it should be understood that the following description of the disclosed aspects of the invention is not intended to limit the present invention to the examples shown in the Figures.

Figures 1, 2:
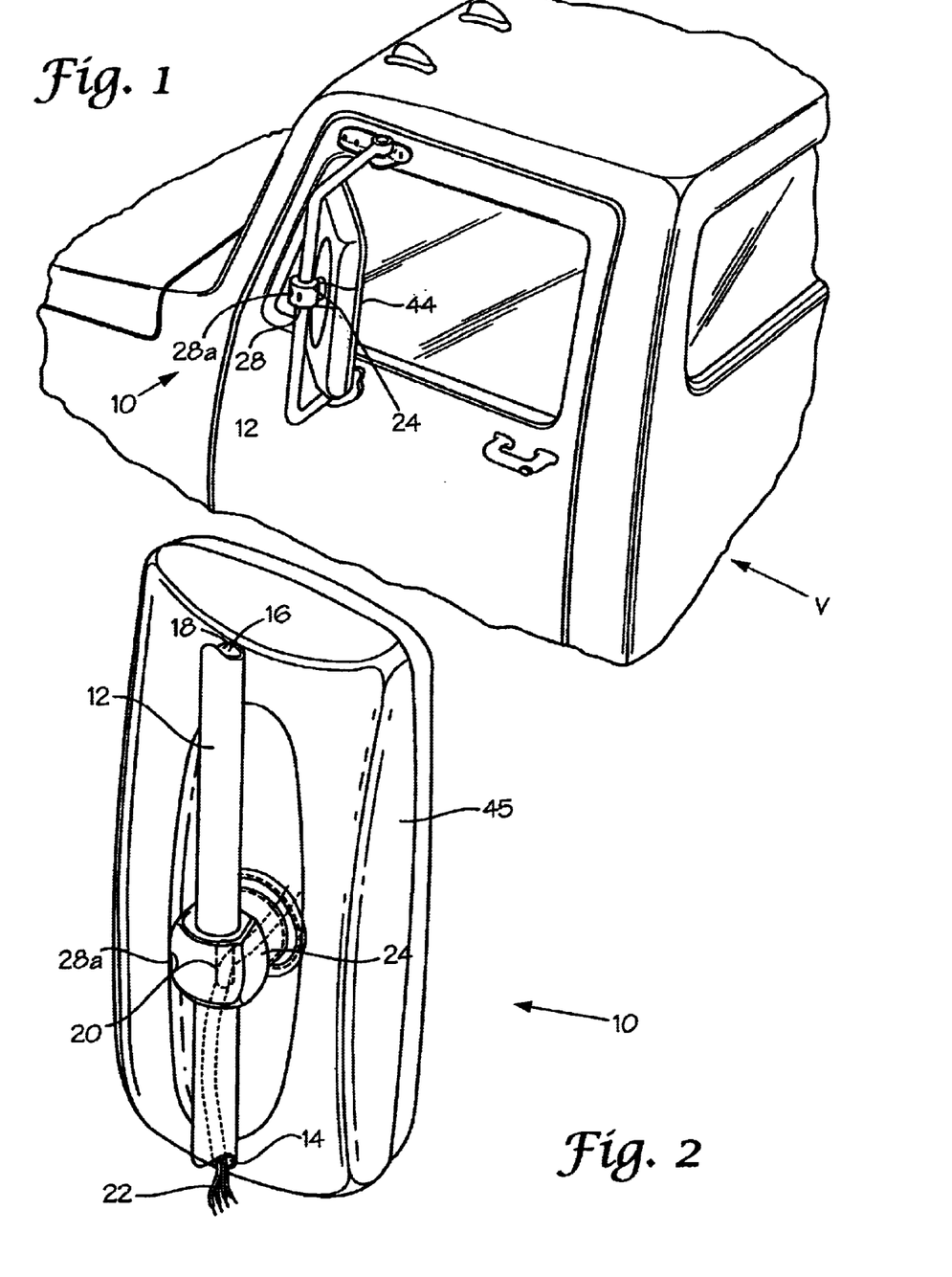
FIG. 1 is a partial perspective view of a mirror mounting assembly according to the present invention in which a mirror housing assembly is disposed on a mounting bar mounted to a vehicle.
FIG. 2 is a partial perspective view of the rear of the mirror mounting assembly of FIG. 1, which shows a wire routed through the mounting bar into the mirror housing assembly.

With more particular reference to the Figures, an example of the mirror mounting apparatus 10 is depicted in FIG. 1. Mirror mounting apparatus 10 includes a base member 24 and an optional cap member 28 (shown most clearly in FIG. 4). Base member 24 is securable to the mounting bar 12 via cap member 28 and is configured for attachment to the mirror housing body 45. As suggested, mounting bar 12 may be secured to the vehicle V in any conventional manner and may comprise the C- or U-shaped bar, an extending bar, or any other type of mounting bar.

FIG. 2 shows a similar but larger view of the mirror mounting apparatus 10 of FIG. 1. In this view, wire 22

(illustratively shown as four separate wires) extends into rod 12 from the first opening 14 and along the cavity 16 and a cavity surface 18 of rod 12. The wire 22 eventually exits rod 12 at the outlet 20 and enters into mirror housing assembly 44 where the wire 22 can be connected to a motor or the like (FIG. 3).

Figure 3:
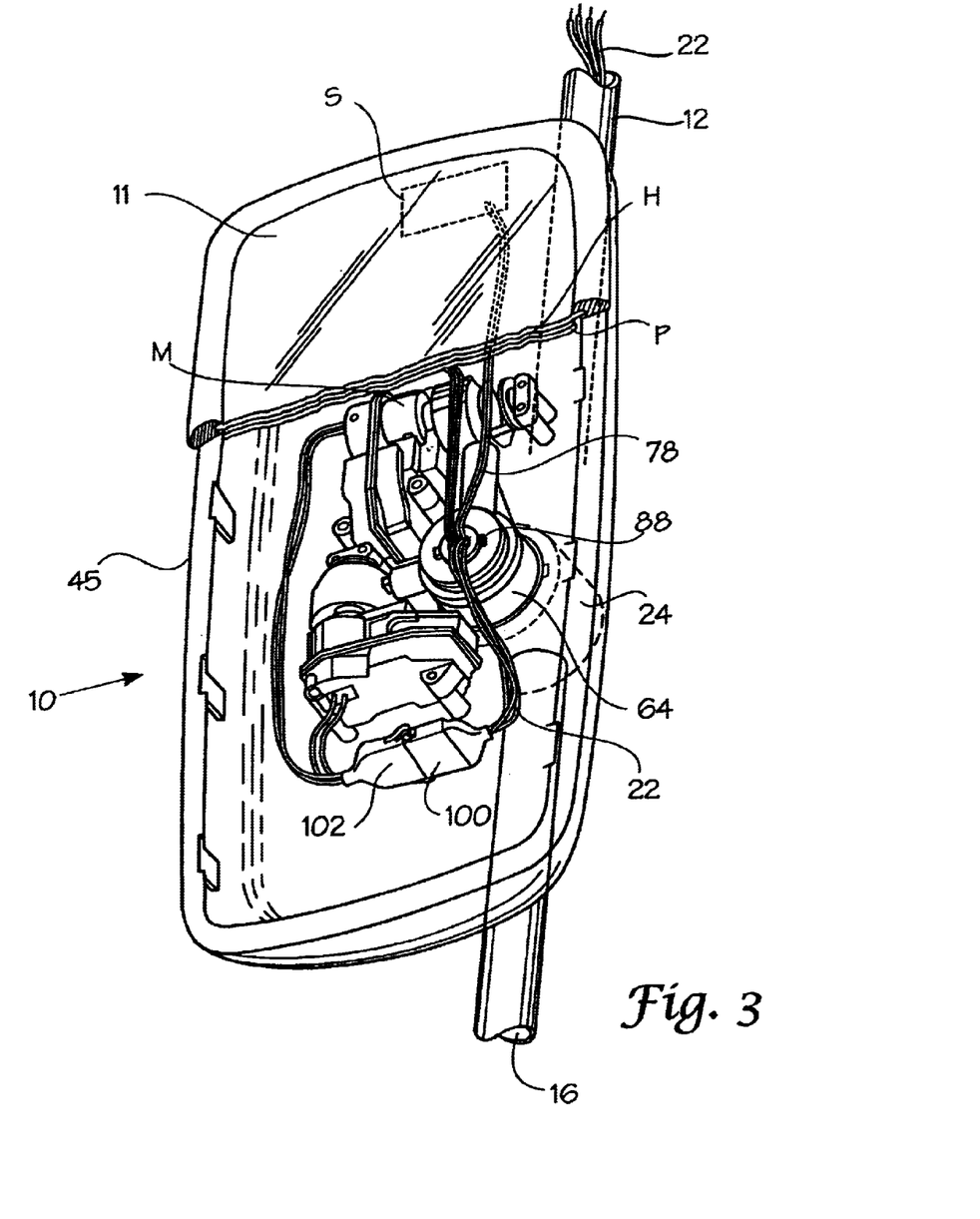
FIG. 3 is a partial sectional view of the front of the mirror mounting assembly of FIG. 1, which shows the wire routed through the mounting bar into the mirror housing assembly.

FIG. 3 is a partially cutaway front view of the FIG. 2 example. In this illustration, a mirror glass 11 is attached to an optional, possibly plastic, carrier plate P, which is attached to the mirror housing body 45 in a known manner. Of particular note, FIG. 3 shows the various components of the mirror mounting apparatus 10 assembled, whereby a fastener or locking washer 88 releasably locks the components together, described in greater detail below. By way of further example, FIG. 3 shows that a second slide member 64 (see also FIG. 4) may include mounting elements 78, 82 that attach to motors M. The mounting elements 78, 82, may also respectively define an optional first and a second mounting support 80, 84 for added structural integrity.

FIG. 3 also shows that wires 22 may terminate at an optional connector 100. Connector 100, which could be any type of electrical, mechanical, or hydraulic connector, is connected to a plug 102 to supply power to devices M. When devices M, such as control motors, are activated by an external element, such as an adjustment button (not shown) in the vehicle V, the mirror housing assembly 44 may be pivoted, for example, to adjust a reflected image in the mirror element 11.

Alternatively, the present invention contemplates carrier plate P attached to motors M such that only mirror element 11 adjusts relative to stationary mirror housing body 45. It should also be appreciated that the present invention does not require a control motor M. For instance, as FIG. 3 shows, wire 22 can attach to heater element H, or to electronic signal device S embedded in a surface of the mirror element 11, or multiple wires 22 can attach to any combination of the foregoing devices. Moreover, wire 22 may be, for example, a hydraulic or fiber optic line respectively connected to a hydraulic pump or fiber optic device M, or any other wire or line used to control or affect some action in or on mirror housing assembly 44.

Figure 4:
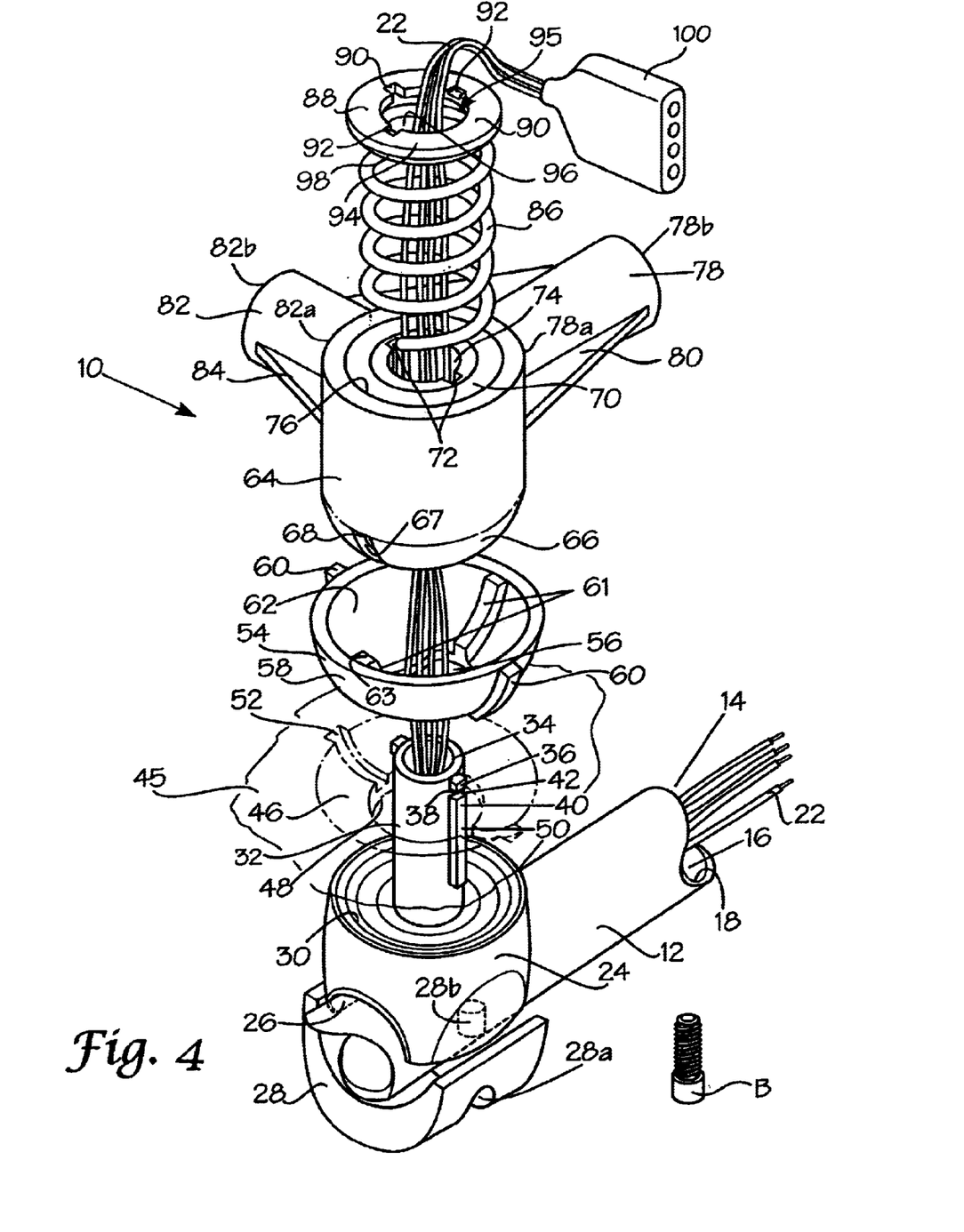
FIG. 4 is an exploded partial perspective view of the mirror mounting assembly.
Figure 5:
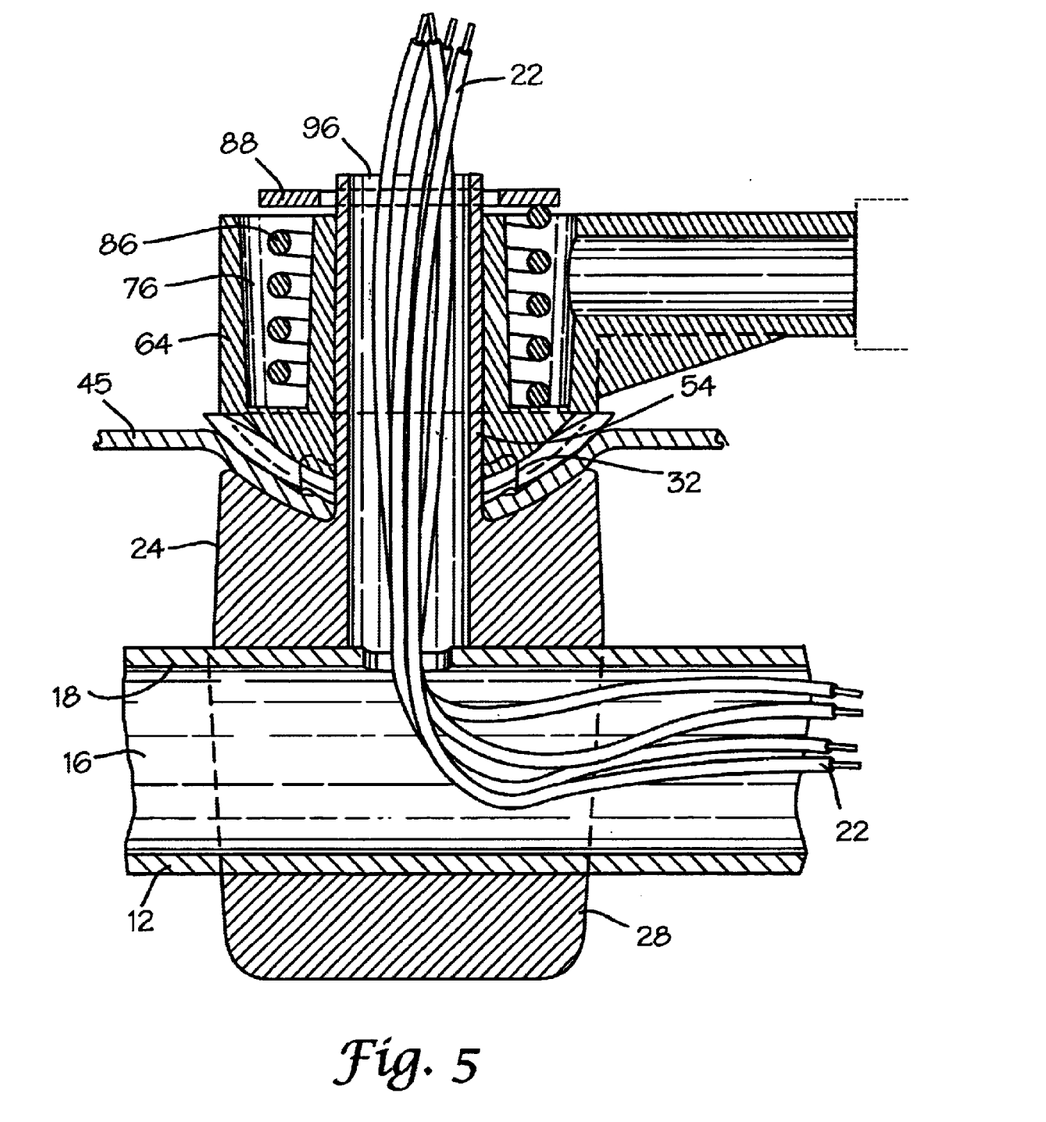
FIG. 5 is a sectional side view of the components of FIG. 4 as assembled.

FIGS. 4 and 5 respectively show exploded and assembled views of the mirror mounting assembly 10. As discussed, the mirror mounting assembly 10 includes the hollow mounting rod 12 through which wire 22 passes. Mirror mounting assembly 10 further includes the base member 24, which attachably seats upon a contour of rod 12 as seen in FIG. 4. Base member 24 may or may not include a conduit or shaft 32, which could be manufactured separately from base member 24. For instance, the conduit 32 could be integrally manufactured with some part of the mirror housing assembly 44 if desired. In any case, as shown, conduit 32 provides a second opening 34 through which wire 22 exits to a first slide member 54. Likewise, first slide member 54 defines a third opening 56 through which wire 22 continues into the second slide member 64. Second slide member 64 has a sleeve 70 which defines a fourth opening 74 through which wire 22 continues until reaching and passing through a fifth opening 96 of the locking ring 88 and into the mirror housing assembly 44 for attachment to motors M, heating element or the like as suggested.

It should be understood that slide members 54 and 64 may be provided with or without use of motors M. Also, slide members 54 and 64 and motors M could be eliminated in favor of other types of adjustment assemblies, within the scope of the invention. In such cases, wire 22 could be threaded through base member 24 to support signaling or heating functions, rather than positioning functions.

Evident from FIGS. 4 and 5, second slide member 64, first slide member 54, and mirror housing body 45 are configured to slide coaxially about the shaft 32 whereupon fastener 88 is fashioned to compress a spring element 86 and releasably hold the foregoing elements together. Moreover, mirror housing body 45, first slide member 54, and second slide member 64 are cooperative to biaxially adjust the mirror housing assembly 44 with mirror glass 11. As suggested, additional or fewer slide members may respectively be added or removed from the present invention depending on the number of axial adjustments desired for the mirror housing assembly 44 or housing body 45, if actuators are adjustably attached to the latter only.

With more particular reference to FIG. 4, mounting bar 12 is received by base member 24 via a channel portion 26. As shown, channel portion 26 optimally defines a curved surface, but channel portion 26 may have other cross-sectional shapes within the scope of the invention. For example, channel portion 26 could have a substantially rectangular or trapezoidal cross-section if desired. The cross-sectional shape of channel portion 26 may be dictated or influenced by the method and material of manufacture of the base member 24 and/or the mounting rod 12.

Further shown in FIG. 4, base member 24 may include the complementary cap member 28, which attaches to the mounting rod 12 substantially opposite the base member 24. Various alternatives may be used to secure cap member 28 to base member 24 and about rod 12, such as nuts and bolts, screws, clips, hinges, collet pins, or the like, designated by the letter B in FIG. 4. Ideally, cap member 28 is removably and adjustably attached to base member 24 to allow for repair, replacement, or adjustment of mirror housing assembly 44 relative to the mounting bar 12. Accordingly, cap member 28 may include screwholes 28 and complimentary screwholes 28b (see FIGS. 1, 2 and 4) in the base member 24 for receiving and seating threaded bolts B or one of the foregoing alternatives.

As an alternative to separate base member 24, cap member 28 and connecting elements B, base member 24 may be unitarily constructed with the cap member 28. Accordingly, unitary base member 24 could be slid along mounting bar 12 and attached to the mounting bar 12 in a well known manner.

FIG. 4 further illustrates that the base member 24 includes a first base surface 30 for contacting a second base surface 48 of mirror housing body 45. In this manner, when locking ring 88 is used to compress biasing device 86, first and second base surfaces 30, 48 matingly abut one another. As discussed, base member 24 may in one embodiment integrally include the shaft 32 as shown in FIG. 4. However, shaft 32 can be manufactured separately and subsequently secured to base member 24 if desired. Alternatively, shaft 32 could be formed integrally with some other part of mirror housing assembly 44 and attached to the base member 24.

Shaft 32 preferably defines at least one locking key part such as first and second keys 36, 40. This feature helps preclude unwanted rotation of mirror housing body 45 relative to bar 12, but also assists in locking the components of the mirror mounting assembly 10 together. More specifically, first key 36 defines a first locking surface 38, which interacts with a second locking or transition surface 94 of fastener 88 and is matingly received by a key rest 92 when fastener 88 compresses together the components of the mirror mounting assembly 10. As shown in the embodiment of FIG. 4, keys 36, 40 define a locking groove 42, which has a square cross-section but any shape may be utilized as desired to correspond to a similar shape for key rest 92.

FIG. 5 shows that the compression spring 86 is disposed between washer 88 and a portion of mirror housing assembly 44 when the mirror mounting apparatus 10 is assembled. As shown, locking washer 88 compresses spring 86 into a receptacle 76 of second slide member 64. Locking washer 88 engages the locking groove 42 and may be rotated clockwise or counterclockwise until key 36 aligns with key rest 92 such that washer 88 holds the assembly 10 together. Thus, mating alignment elements 36, 38, 40, 42, 90, and 92 rotationally secure element 88 relative to assembly 10. Although these elements are shown with planar surfaces and square cross-sections, they may comprise any variety of noncircumferential shapes or surfaces operable to rotatably lock the mirror assembly 10 together. For instance, the shapes of elements 36, 38, 40, 42, 90 and 92, as well as edge 95, could be nonplanar, oblong, oval, or the like and be within the scope of the invention.

In an aspect of the invention, with reference to both FIGS. 4 and 5, the mirror mounting assembly 10 includes, as discussed, the mounting rod 12, the base member 24 and conduit 32 with locking key 36, and the mirror housing body 45 for supporting the mirror glass 11, which also defines a passage 50 through which conduit 32 passes. This embodiment may include the first slide member 54 with third opening 56, the first spherical surface 58, the second receiving surface 62, and a first raised arcuate member 60. The second receiving surface 62 defines a second raised arcuate member 61, which defines a first stopping surface 63. When compressibly assembled, the first receiving surface 46 of mirror housing body 45 contacts the first spherical surface 58 of first slide member 54.

This aspect of the invention also includes the second slide member 64 having a fourth opening 74 for passage of the wire 22, a notch 72 located in the vicinity of the fourth opening 74 for passage of locking key 36, a second groove 67 for slideable receipt of the second raised arcuate member 61, one or more mounting elements 78, 82, a second spherical surface 66, and the receptacle 76. The second groove 67 defines a second stopping surface 68, which in cooperation with the first second stopping surface 63 impedes the movement of the second slide member 64 beyond a predetermined position. Also shown are the optional mounting elements 78, 82 each having a proximal end 78a, 82a and a distal end 78b, 82b. The proximal ends 78a, 82a are attached to the second slide member 64, and the distal ends 78b, 82b depend away from the proximal ends 78a, 82a and the second slide member 64 for attachment to other devices (not shown) in the mirror mounting assembly 10.

In the foregoing example, mating receiving and spherical surfaces 46, 58, 62, 66 of slide members 54, 64 and mirror housing 44 cooperate to biaxially adjust the mirror housing assembly 44 relative to base member 24 and mirror mounting bar 12 when an attached motors M, for instance, imparts controlled movement to members 45, 54, and 64. Further detail of electromotive or other interaction of these members need not be given to appreciate or practice the full range of the present invention.

Referring particularly to FIG. 4, fastener 88 of this aspect of the invention may include an extrusion or projection 98 for contacting and controlling compression element or helical spring 86. When fastener 88 is depressed axially in the direction of the rod 12, projection 98 presses against spring 86 and overcomes the bias of spring 86 to seat the spring 86 into receptacle 76 of second slide member 64. As this compression action occurs, the first key 36 is directed along the notch 72 in the second slide member 64. Eventually, key 36 passes through a complimentary keyhole 90 of fastener 88 until key 36 is axially level with the second locking surface 94. Upon momentary further depression of fastener 88, first key 36 exits keyhole 90 and simultaneously radially aligns an inner edge 95 with the locking groove 42 to permit locking ring 88 to be rotated in either direction until the first locking surface 38 of first key 36 is axially and radially aligned with the key rest 92. At this juncture, external axial and torsional pressures to fastener 88 may be released as the first locking surface 38 of first key 36 will releasably rest in key rest 92 and hold the mirror mounting apparatus 10 together as shown in FIG. 5.

With regard to manufacturing possibilities of various elements of the present invention, base member 24 and cap member 28 may be made of a cast metal such as aluminum, although both could be made of a plastic such as nylon, if desired. Slide members 54, 64 may be constructed of a plastic such as nylon. Mirror housing body 45 is optimally made of a plastic such as A.B.S. Regardless of the materials selected, they should allow for secure and reliable attachment together and resist unwanted movement once secured. Additionally, the strength of the compression spring 86 should be strong enough to hold the mirror housing assembly 44 in place. If desired, frictional coatings or surface treatments may be used to alter frictional characteristics to optimize performance.

It will be apparent to those skilled in the art that various modifications and variations can be made in the present invention without departing from the scope and spirit of the invention. For example, the relative position of mating elements such as 52, 60, 61, 67 (grooves and ridges) on opposing parts could be reversed. Also, the cross-sectional shape of bar 12, mating receiving and spherical surfaces 46, 58, 62, 66 of slide members 54, 64, and mirror housing 44 could be altered from that depicted. It is intended that the present invention include such modifications and variations as come within the scope of the appended claims and their equivalents.

What is claimed is:

1. A mirror mounting assembly for a vehicle, the mirror mounting assembly comprising:

a mounting bar having an inner surface that defines a cavity extending axially and an outlet, the mounting bar defining a first opening therethrough in communication with the cavity, the mounting bar configured to be affixed to the vehicle and the cavity configured to receive a wire from the first opening;

a base member mounted to a portion of the mounting bar, the base member having a first base surface and a conduit with a second opening therethrough, the conduit defining a key element and configured to route the wire from the outlet of the conduit through the mirror mounting assembly;

a mirror housing for supporting a mirror glass, the mirror housing having a passage therethrough, a first receiving surface and a second base surface, the mirror housing disposed between the base member and the first slide member, the aperture configured to receive the conduit and the wire;

a first slide member having a third opening therethrough, a first spherical surface, a second receiving surface, and a first raised arcuate member, the third opening configured to receive the conduit, the first spherical surface configured to contact the first receiving surface, the second receiving surface defining a second raised arcuate surface, the second raised arcuate surface defining a first stopping surface;

a second slide member having a fourth opening therethrough, a notch, a second groove, a mounting element, a second spherical surface, and a receptacle, the second groove defining a second stopping surface, the first and second stopping surfaces cooperative to impede a movement of the second slide member beyond a predetermined position, the mounting element having a proximal end and a distal end, the proximal end attached to the second slide member, the distal end depending from the proximal end away from the second slide member, the notch proximate the fourth opening;

means interposed in the mirror mounting assembly for urging together the mirror mounting assembly; and a locking ring having a fifth opening therethrough, a keyhole, and a second transition surface, the keyhole defined proximate the fifth opening and configured to receive the key element when the locking groove is substantially aligned with the keyhole, the locking ring configured such that the second transition surface is axially alignable with the first transition surface, the locking ring further configured to overcome the means for urging together such that the mirror mounting assembly is locked together.

2. The mirror mounting assembly of claim 1, wherein the base member defines a channel portion, the channel portion configured to be adjustably mounted to the mounting bar.

3. The mirror mounting assembly of claim 1, further comprising a cap member adjustably mounted to another portion of the mounting bar, the base member and cap member attachable to each other such that the mounting bar is disposed substantially between the cap and base members.

4. A mirror mounting assembly for a vehicle, the mirror mounting assembly comprising:

a mounting rod having a first opening therethrough defining an outlet, the mounting rod configured to be affixed to the vehicle and the first opening configured to route a wire through the mounting rod;

a base member mounted to a portion of the mounting rod, the base member having a first base surface and a conduit with a second opening therethrough, the conduit having a locking key and configured to route the wire from the outlet through the second opening into the mirror mounting assembly;

a mirror housing for supporting a mirror glass, the mirror housing having a passage, a first receiving surface and a second base surface, the passage configured to receive the conduit, the second base surface configured to seat against the first base surface;

a first slide member having a third opening therethrough, a first spherical surface, a second receiving surface, and a first raised arcuate member, the third opening configured to receive the conduit, the second receiving surface defining a second raised arcuate member, the second raised arcuate surface defining a first stopping surface, the first receiving surface contacting the first spherical surface;

a second slide member having a fourth opening therethrough, a notch, a second groove, a mounting element, a second spherical surface, and a receptacle, the second groove defining a second stopping surface, the first and second stopping surfaces cooperative to impede a movement of the second slide member beyond a predetermined position, the mounting element having a proximal end and a distal end, the proximal end attached to the second slide member, the distal end depending from the proximal end away from the second slide member, the notch proximate the fourth opening;

a spring compression element configured to compressibly seat in the second slide member; and a fastener having a fifth opening therethrough and a transition surface, the fifth opening configured to deliver an end of the wire to the mirror mounting assembly, the fastener configured to be depressed axially in a direction of the mounting rod to compress the spring compression element and urge together the base member, the mirror housing, the first slide member, and the second slide member, the fastener and the locking key configured to translate rotation of the fastener relative to the locking key to lock the mirror mounting assembly together.

5. The mirror mounting assembly of claim 4, further comprising mating alignment elements disposed on the transition surface, the fastener configured to be rotationally secured to the second slide member.

6. A method of assembling a rearview mirror mounting assembly for a vehicle, the mounting assembly having a mounting rod, a housing, a base member having a hole therethrough, a cap member, a spring element, and a fastener, the mounting assembly configured for receiving a wire, the method of assembling the rearview mirror mounting assembly comprising the steps of:

providing the mounting rod with an opening and an outlet therethrough, the rod configured for attachment to the vehicle and to the base member, the opening configured to feed the wire through the rod and into the base member from the outlet;

providing the wire to be routed;

feeding the wire through the opening in the mounting rod;

feeding the wire from the outlet through the hole in the base member and into the housing;

connecting the wire to an element in the housing, the element selected from a group consisting of an electric motor wire, a heating element wire, a display device wire, a hydraulic line, a fiber optic cable and combinations thereof, releasably attaching the base member and the cap member to the mounting rod;

connecting the housing, the base member, and the spring element together with the fastener; and attaching a mirror element to the housing.

7. A mirror mounting apparatus for a vehicle having a mounting rod, the mounting rod, the mounting rod configured to be affixed to the vehicle, the mirror mounting apparatus comprising:

a mirror housing assembly including a mirror housing body having a first opening configured to support a mirror glass;

a base member for mounting the mirror housing assembly to the mounting rod, the base member having a shaft;

a slide member having a second opening said mirror housing body and said slide member receiving said shaft through said first and second openings;

a compression element disposed coaxially about the shaft and configured to urge the slide element, the mirror housing assembly and the mounting rod together; and a locking device having engaged and disengaged positions, the locking device configured to compress the compression element to releasably hold the slide element, the mirror housing assembly and the mounting rod together when in the engaged position.

8. The mirror mounting apparatus of claim 7 wherein there are a plurality of slide elements engaged over said shaft.

9. The mirror mounting apparatus of claim 7 further comprising a cap member attachable to the base member such that the mounting rod is disposed between the attached cap and the base members.

10. A mirror mounting apparatus for a vehicle, the mirror mounting apparatus comprising:
- a mounting rod, the mounting rod configured to be affixed to the vehicle;
- a mirror housing assembly configured to support a mirror glass, the mirror housing assembly having a base member for mounting to the mounting rod, the base member having a shaft having a key adjacent a terminal end;
- a cap member attachable to the base member;
- a slide member having a shaft opening therethrough to receive the shaft, the slide member being adjustably engaged with the mirror housing assembly;
- a biasing device configured to resistively urge the slide member, the mirror housing, and the base member together; and
- a locking device having an opening therethrough for receiving said shaft, the locking device being adapted to compress the biasing device about the shaft and releasably hold the slide member, the mirror housing, and the mounting rod together.

11. A mirror mounting assembly having a mirror housing with a mirror for a vehicle, an opening through the mirror mounting assembly to the mirror housing, the mirror mounting assembly comprising:
- a mounting bar having an inner surface that defines a cavity, the mounting bar defining an aperture therethrough in communication with the mirror mounting assembly and further defining a first opening therethrough in communication with the cavity, the mounting bar configured to be affixed to the vehicle;
- a base member configured to be mounted to a portion of the mounting bar, the base member having a first base surface and a conduit, the conduit having a second opening therethrough and defining a securement element, the conduit in communication with the cavity;
- a cap member attachable to the base member, the cap member and base member configured to adjustably affix the mirror housing to the mounting bar;
- a first slide member defining a third opening therethrough, a first spherical surface, and a receiving surface, the third opening configured to receive the conduit and the wire;
- a second slide member defining a fourth opening therethrough and a second spherical surface, the second spherical surface configured to contact the receiving surface, the fourth opening configured to receive the conduit, the first and second slide members configured to slidably adjust relative to each other and to the mirror housing;
- a spring compression element configured to be compressibly disposed about a part of the conduit; and
- a fastener defining a fifth opening therethrough, the fifth opening configured to receive the securement element and the wire, the fastener configured to compress the spring compression element and urge together the second slide member, the first slide member, the mirror housing, and the base member, the fastener further configured to rotatably lock to the securement element such that the mirror mounting assembly is coupled together.

* * * * *